UNITED STATES PATENT OFFICE.

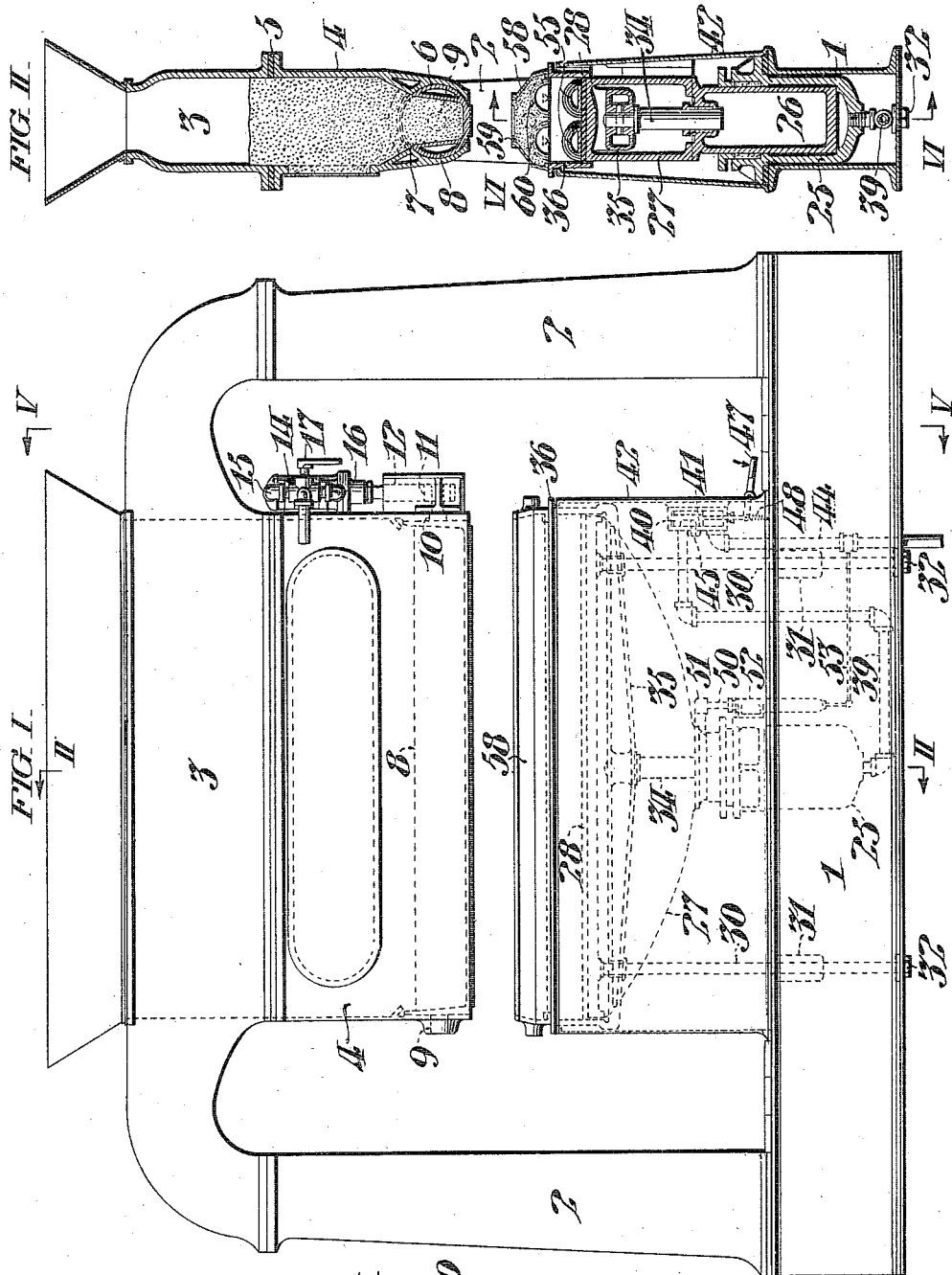

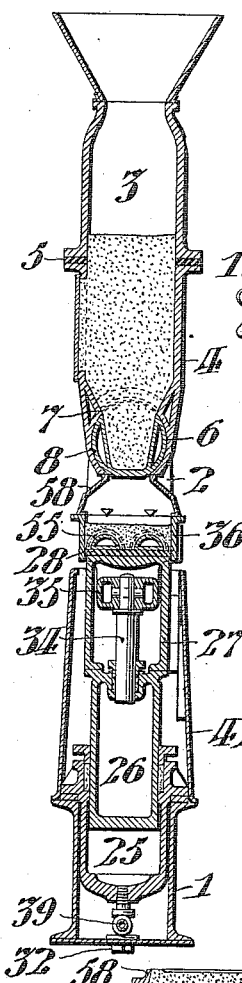
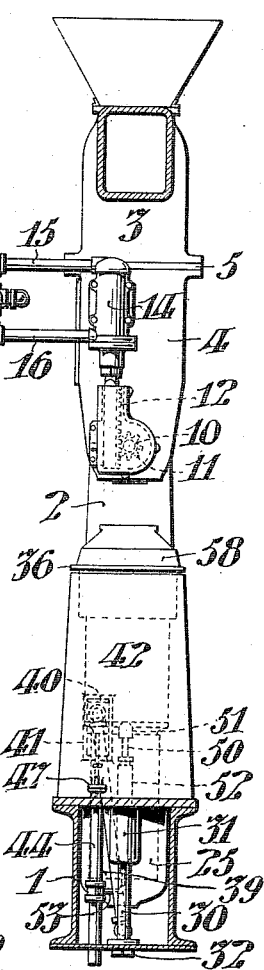
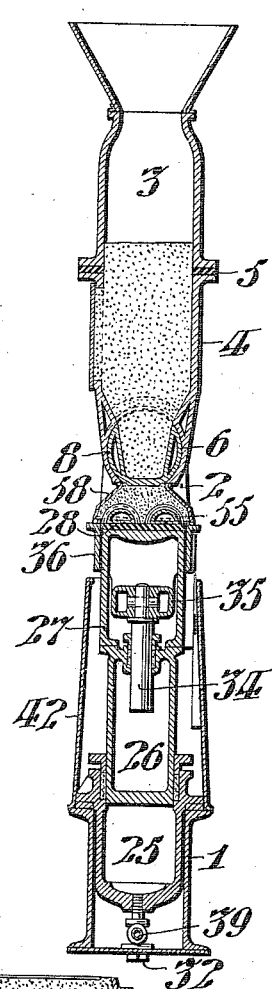
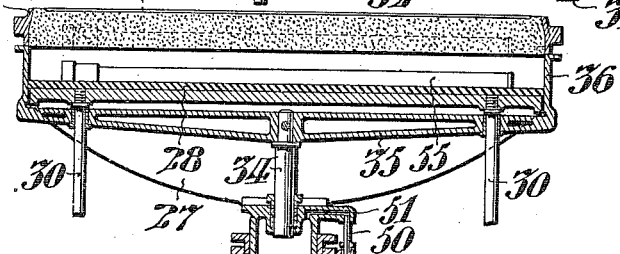

VICTOR MAUCK AND JACOB EDWARD WENTLING, OF CONSHOHOCKEN, PENNSYLVANIA.

MOLDING-MACHINE.

972,771.   Specification of Letters Patent.   Patented Oct. 11, 1910.

Application filed January 15, 1909. Serial No. 472,421.

*To all whom it may concern:*

Be it known that we, VICTOR MAUCK and JACOB EDWARD WENTLING, of Conshohocken, in the State of Pennsylvania, have invented a certain new and useful Improvement in Molding-Machines, whereof the following is a specification, reference being had to the accompanying drawings.

Our invention relates to a machine whereby a series of molds of a given pattern may be made in respective flask members; said machine being operated to successively measure the required quantity of sand, deposit the sand in proper relation with the pattern, and pack the molded sand into flask members which are successively supplied to and removed from the machine.

The form of our invention hereinafter described, includes the combination with a sand hopper supported in rigid relation with a machine frame, and forming a stationary abutment; of a rotary sand meter mounted to turn on a horizontal axis at the discharge opening of said hopper; and, means arranged to turn said meter, whereby a quantity of sand, which may be varied by adjustment of the meter, is received from the hopper and discharged beneath the latter into a drag frame, in proper relation with a pattern which is supported by a mold plate arranged to rise and fall within said drag frame; the latter being also arranged to rise and fall. Said drag frame serves as a support for flask members which are successively deposited thereon, and said drag frame and mold plate have means whereby they are differentially moved to raise a flask member into contact with said abutment, and then raise the required amount of sand into said flask member and press the pattern therein to form a mold in said flask member; whereupon, reverse movements of said mold plate and drag frame respectively remove the pattern from the mold in said flask member and release said member from engagement with the abutment so that it may be removed from the drag frame, and another flask member substituted for it.

As hereinafter described, the desired differential movement of said drag frame and mold plate is effected by providing them with respective plungers arranged to reciprocate one within the other, within a cylinder to which a motor fluid is supplied under control of a valve. The described means for turning said meter comprises a plunger operatively related to a shaft on said meter, concentric with its horizontal axis; a cylinder inclosing said plunger, and, a valve arranged to control a motor fluid with respect to said cylinder.

Our invention comprises the various novel features of construction and arrangement hereinafter more definitely specified.

In the drawings; Figure I is a side elevation of a machine conveniently embodying our improvement. Fig. II is a vertical sectional view, taken on the line II, II in Fig. I. Figs. III and IV are vertical sectional views similar to Fig. II, but showing the parts of the machine in different positions representing successive periods in the operation thereof. Fig. V is a vertical sectional view taken on the line V, V, in Fig. I. Fig. VI is a fragmentary sectional view taken on the line VI, VI, in Fig. II. Fig. VII shows a vertical sectional view of the sand meter indicated in Fig. II, but showing means whereby its capacity may be variably predetermined.

In said figures; the machine base 1, has the standards 2, supporting the hopper 3, in rigid relation therewith. As shown in Fig. II, said hopper includes the meter casing 4, which is secured thereon by means including a resilient gasket 5, which permits of precise adjustment of said casing, so that it forms a stationary abutment limiting the upward movement of the flask in the operation of forming the sand mold in the latter. The lower portion of said casing 4, comprises a cylindriform recess 6, below the discharge opening 7, of the hopper, in which the rotary sand meter 8, is mounted to turn on a horizontal axis concentric with the stud shafts 9 and 10, projecting from the respectively opposite ends thereof. As shown in Fig. V, said shaft 10, is provided with a gear wheel 11, in operative relation with the rack plunger 12, which is mounted to reciprocate in the cylinder 14, wherein it is operated by the motor fluid supplied through the pipes 15 and 16, under control of the valve 17, said fluid being thereby supplied to and exhausted from the respectively opposite ends of said cylinder 14, to alternately turn said meter 8, to discharge its sand contents beneath said hopper and return said meter to the position shown in the drawings, wherein it is adapted to receive a charge of sand from said hopper. It is to be understood that the quantity of sand thus measured by and discharged from the meter 8, may be variably predetermined by inserting in said meter, blocks 20, of different dimensions, one of said blocks being indicated in Fig. VII; such blocks being detachably retained in the meter by any suitable means; for instance, by screws 21.

The cylinder 25, is supported in rigid relation with the machine base 1, in operative relation with the plunger 26, having the cross head 27, supporting the mold plate 28, which is thus arranged to be raised and lowered by and with said plunger 26. Said cross head 27, is conveniently provided with guide rods 30, depending in rigid relation with the opposite ends thereof parallel with the axis of reciprocation of said plunger 26, and fitted to slide in the bearings 31, in rigid relation with said machine base 1. As best shown in Fig. I, said rods 30, are provided with nuts 32, which are vertically adjustable upon the lower ends thereof to limit the upward movement of said mold plate 28. Said plunger 26, incloses the plunger 34, which supports the cross head 35, carrying the drag frame 36. Said drag frame which surrounds said mold plate 28, is thus arranged to be raised and lowered either contemporaneously with or differentially from said mold plate, and by pressure of a motor fluid as hereinafter described. As shown in Fig. I, said cylinder 25, is provided with the pipe 39, through which the motor fluid may be supplied thereto or exhausted therefrom under control of the valve 40. The casing 41, of said valve 40, is conveniently mounted in rigid relation with the frame casing 42, and the motor fluid is supplied to said valve casing 41, through the pipe 44. As shown in Fig. I, said valve 40, is in position to permit the exhaust of the motor fluid from said cylinder 25, through the pipe 39, and exhaust port 45, in the valve casing 41; said valve 40, being conveniently operated by means of the foot lever 47, and spring 48, as indicated. Said plunger 34, normally presents the drag frame 36, at the upper limit of its range of movement with respect to the mold plate 28, as shown in Fig. VI, being upheld by constant pressure of motor fluid within said plunger 26, in which said plunger 34, is arranged to reciprocate; said fluid being supplied through the pipe 50, which is carried by the extension 51, on said plunger 26, and arranged to reciprocate in the bracket 52, which is rigidly connected with the cylinder 25, and in communication with the pipe 53, leading to the motor fluid supply pipe 44, as shown in Fig. I.

The machine shown is particularly designed to make molds for soil pipe, and accordingly, said mold plate 28, carries two half patterns 55, of a standard length of such pipe.

As shown in Figs. I and II, the drag frame 36, supports a flask cope member 58, which is conveniently formed with its sides converging toward the opening 59, in its top, so that if desired, a quantity of sand greater than that necessary to form the mold 60, in said flask member may be forced therein, so that the surplus escapes through said opening 59. However, the capacity of said meter 8, may be variably adjusted to measure the precise quantity of sand necessary to form the mold 60, shown in Fig. II, and the machine may be operated to produce such a mold as follows:—The flask member 58, shown in Figs. I and II, being removed, the meter 8, may be rotated to discharge the desired quantity of sand from the hopper 3, into the drag frame 36, surrounding the patterns 55. The foot lever 47, being then released, the valve is shifted to its lower position by the spring 48, thus admitting the motor fluid under pressure to the cylinder 25, in operative relation with the plunger 26, which is thus raised, carrying with it the cross head 27, and all of the other members shown above said plunger 26, in Fig. VI; said members moving together without relative movement until the flask member 58, is brought into contact with the meter casing 4, which as part of the hopper, forms a stationary abutment. As said plunger 26, continues to rise after the flask member 58, and its supporting drag frame 36, come to rest; the mold plate 28, carried by the cross head 27, of said plunger 26, then rises in the drag frame 36, of course carrying with it the patterns 55, and the sand deposited around them, until the upper surface of said mold plate is presented flush with the lower surface of said flask member 58, as shown in Fig. IV, thus packing the sand within said flask member and forming therein the mold 60. It may be observed that during the differential movement of said mold plate 28, and drag frame 36, above described, the plunger 34 is forced into the plunger 26, against the constantly maintained fluid pressure in the latter, which upholds the drag frame 36, with the flask member 58, against the stationary abutment aforesaid. The mold 60, having been formed in the flask member 58, as above described, the foot lever 47, is then depressed and the valve 40, thus returned to the position shown in Fig. I. Whereupon the fluid pressure in the cylinder 25, escapes through the pipe 39, valve 40, and exhaust port 45, with the effect that the differential movement of the mold plate 28, and drag frame 36, is reversed while the flask member 58, is still maintained in contact with said abutment until said mold plate and drag frame assume their normal relative position shown in Fig. III; said differential movement being immediately followed by the lowering of both said mold plate and drag frame together, to the initial position shown in Fig. II, thus disengaging the flask member 58, from said abutment. Whereupon said flask member may be removed, charged with the mold 60, and another empty flask member be substituted for the same, and the operation repeated.

We do not desire to limit ourselves to the precise details of construction and arrangement above described, as it is obvious that various modifications may be made therein without departing from the essential features of our invention as defined in the appended claims.

We claim:—

1. In a molding machine, the combination with a stationary sand hopper forming a stationary abutment; of a rotary sand meter mounted on a horizontal axis at the discharge opening of said hopper; means arranged to turn said meter, comprising a plunger operatively related to a shaft on said meter concentric with said axis; a cylinder inclosing said plunger; a valve arranged to control a motor fluid with respect to said cylinder; a drag frame beneath said hopper; a mold plate in said frame; means arranged to raise and lower said frame and plate in differential relation with respect to said abutment, including a plunger carrying said plate, a plunger carrying said frame and inclosing said plate plunger; a cylinder inclosing both of said plungers; and, means arranged to control a motor fluid in operative relation to said cylinder.

2. In a molding machine, the combination with a sand hopper forming a stationary abutment; of a rotary sand meter mounted on a horizontal axis at the discharge opening of said hopper; means arranged to turn said meter, operatively related to a shaft on said meter concentric with said axis; a drag frame beneath said hopper; a mold plate in said frame; means arranged to raise and lower said frame and plate in differential relation with respect to said abutment, including a plunger carrying said plate, a plunger carrying said frame and inclosing said plate plunger; a cylinder inclosing both of said plungers; and, means arranged to control a motor fluid in operative relation to said cylinder.

3. In a molding machine, the combination with a sand hopper forming a stationary abutment; of a rotary sand meter at the discharge opening of said hopper; means arranged to turn said meter; a drag frame beneath said hopper; a mold plate in said frame; means arranged to raise and lower said frame and plate in differential relation with respect to said abutment, including a plunger carrying said plate, a plunger carrying said frame and inclosing said plate plunger; a cylinder inclosing both of said plungers; and, means arranged to control a motor fluid in operative relation to said cylinder.

4. In a molding machine, the combination with a sand hopper forming a stationary abutment; of a rotary sand meter at the discharge opening of said hopper; means arranged to turn said meter; a drag frame beneath said hopper; means arranged to raise and lower said frame with respect to said abutment, including a plunger carrying said frame; a cylinder inclosing said plunger; and, means arranged to control a motor fluid in operative relation to said cylinder.

5. In a molding machine, the combination with a sand hopper forming a stationary abutment; of a rotary sand meter at the discharge opening of said hopper; means arranged to turn said meter; a drag frame beneath said hopper; a mold plate in said frame; means arranged to raise and lower said plate with respect to said abutment, including a plunger carrying said plate, a cylinder inclosing said plunger; and, means arranged to control a motor fluid in operative relation to said cylinder.

6. In a molding machine, the combination with a sand hopper forming an abutment; of a drag frame; a mold plate arranged to rise and fall in said frame; and means arranged to raise and lower said drag frame and plate in differential relation with respect to said abutment.

7. In a molding machine, the combination with a sand hopper forming an abutment; of a drag frame; a mold plate arranged to rise and fall in said frame; and means arranged to differentially move said drag frame and plate with respect to said abutment.

8. In a molding machine, the combination with a sand hopper forming an abutment; of a drag frame; and means arranged to raise and lower said drag frame with respect to said abutment.

9. In a molding machine, the combination with a sand hopper forming an abutment; of a mold plate; and means arranged to raise and lower said plate with respect to said abutment.

10. In a molding machine, the combination with a drag frame; of a mold plate in said frame; a plunger carrying a cross head supporting said mold plate and having dependent guide rods; a plunger carrying a cross head extending within the cross head aforesaid in engagement with said guide rods and supporting said drag frame; and means arranged to control a motor fluid; whereby said drag frame may be raised and lowered either contemporaneously with or differentially from said mold plate.

11. In a molding machine, the combination with a drag frame; of a mold plate in said frame; a plunger carrying a cross head supporting said mold plate and having dependent guide rods; a plunger carrying a cross head extending within the cross head aforesaid in engagement with said guide rods and supporting said drag frame; and means arranged to raise and lower said drag frame and mold plate.

12. In a molding machine, the combination with a stationary cylinder; of a hollow plunger arranged to reciprocate in said cylinder; a second plunger arranged to reciprocate in said hollow plunger; and cross heads carried by said plungers, respectively supporting a mold plate and a drag frame.

13. In a molding machine, the combination with a stationary cylinder; of a hollow plunger arranged to reciprocate in said cylinder; a second plunger arranged to reciprocate in said hollow plunger; means arranged to control a supply of motor fluid to said cylinder independently of said hollow plunger; and, means arranged to supply a motor fluid within said hollow plunger including telescoping members respectively carried by said cylinder and by said hollow plunger.

In testimony whereof, we have hereunto signed our names at Conshohocken, Pennsylvania, this twenty-eighth day of December 1908.

VICTOR MAUCK.
JACOB EDWARD WENTLING.

Witnesses:
  WM. WRIGHT,
  C. A. RAMSEY.